United States Patent
Fischer et al.

(10) Patent No.: US 7,688,249 B2
(45) Date of Patent: Mar. 30, 2010

(54) METHOD FOR DETERMINING TYPES OF PRECIPITATION IN THE ATMOSPHERE

(75) Inventors: Bernd Fischer, Hamburg (DE); Gerhard Peters, Hamburg (DE)

(73) Assignee: METEK GmbH (DE)

( * ) Notice: Subject to any disclaimer, the term of this patent is extended or adjusted under 35 U.S.C. 154(b) by 38 days.

(21) Appl. No.: 10/544,956

(22) PCT Filed: Feb. 2, 2004

(86) PCT No.: PCT/DE2004/000153

§ 371 (c)(1),
(2), (4) Date: Oct. 21, 2005

(87) PCT Pub. No.: WO2004/070418

PCT Pub. Date: Aug. 19, 2004

(65) Prior Publication Data

US 2006/0097907 A1     May 11, 2006

(30) Foreign Application Priority Data

Feb. 7, 2003    (DE) ................. 103 05 139

(51) Int. Cl.
G01S 13/95 (2006.01)
(52) U.S. Cl. .................... 342/26 R; 342/192
(58) Field of Classification Search ............... 342/26 R
See application file for complete search history.

(56) References Cited

U.S. PATENT DOCUMENTS

| | | | | |
|---|---|---|---|---|
| 4,268,828 A | * | 5/1981 | Cribbs et al. ............... | 342/26 D |
| 4,613,938 A | | 9/1986 | Hansen et al. | |
| 4,660,038 A | * | 4/1987 | Greneker, III ............. | 342/26 D |
| 5,839,089 A | * | 11/1998 | Yasuda et al. .................. | 702/3 |
| 5,974,360 A | * | 10/1999 | Otsuka et al. .................. | 702/3 |
| 6,061,013 A | * | 5/2000 | Sauvageot et al. ........ | 342/26 R |
| 6,307,500 B1 | * | 10/2001 | Cornman et al. .......... | 342/26 R |
| 6,615,140 B2 | * | 9/2003 | White et al. .................... | 702/3 |
| 6,670,908 B2 | * | 12/2003 | Wilson et al. ............. | 342/26 R |
| 2002/0005798 A1 | * | 1/2002 | Wada et al. ................... | 342/26 |

OTHER PUBLICATIONS

METEK: "MRR-2: Micro Rain Radar/Disdrometer" Available online: <http://web.archive.org/web/*/http://www.metek.de/produkte_mrr.htm> Jan. 26, 2002. pp. 1-3.*

(Continued)

*Primary Examiner*—Thomas H Tarcza
*Assistant Examiner*—Matthew M Barker
(74) *Attorney, Agent, or Firm*—Robert W. Becker; Robert Becker & Associates (57) ABSTRACT

A method for determination of precipitation types in the atmosphere is described, wherein an output signal, in particular a radar signal, having a transmitting frequency spectrum is transmitted, reflection signals formed by reflection of the output signals at precipitation particles at at least two atmospheric levels and having a reflection spectrum are detected, and wherein finally the characteristics of the reflection signals are analyzed.

The method according to the invention is characterized in that on analyzing characteristics of the reflection signals a course of a difference frequency spectrum formed by transmission frequency and reflection frequency spectrum is analyzed resolved by altitude levels.

17 Claims, 3 Drawing Sheets

OTHER PUBLICATIONS

Peters et al. "Rain observations with a vertically looking Micro Rain Radar (MRR)" Boreal Environment Research. vol. 7, Dec. 23, 2002. pp. 353-362.*

Tokay et al. "Tropical Rainfall Associated with Convective and Stratiform Clouds Intercomparison of Disdrometer and Profiler Measurements". Journal of Applied Meteorology. vol. 38. Issue 3. Mar. 1999. pp. 302-320.*

"Notes and Correspondence On the Performance of a Low-Cost K-Band Doppler Radar for Quantitative Rain Measurements" Martin Loffler-Mang and Michael Kunz.

"A New Precipitation Occurrence Sensor System" Sheppard, Wu and Wilson.

"An Improved AES Precipitation Occurrence Sensor System" B.E. Sheppard and K.K. Wu.

* cited by examiner

METHOD FOR DETERMINING TYPES OF PRECIPITATION IN THE ATMOSPHERE

This specification for the instant application should be granted the priority date of Feb. 7, 2003, the filing date of the corresponding German Patent application 103 05 139 as well as the priority date of 2 Feb. 2004, the filing date of the corresponding International patent application PCT/DE2004/000153 filed Feb. 2, 2004.

FIELD OF THE INVENTION

The invention relates to a method for determination of precipitation types in the atmosphere, wherein an output signal, in particular a radar signal, having a transmitting frequency spectrum is transmitted, reflection signals formed by scattering of the output signals at precipitation particles at at least two atmospheric levels, and having a reflection spectrum, are detected, and wherein finally the characteristics of the reflection signals are analyzed.

BACKGROUND OF THE INVENTION

Monitoring the atmosphere regarding precipitation phenomena is of high significance for air and road traffic, agriculture and water management. Therefore, a multitude of systems is known, with which precipitation types in the atmosphere can be detected. The precipitation types to be detected include all forms of liquid and frozen precipitation, like e.g. rain, drizzle, snow and hail. Furthermore, airborne particles in the atmosphere are of significance as well, since they also can result in visibility obstacles. Such airborne particles generally include mist, fog, haze, dust or the like. Conventional instruments for monitoring atmospheric phenomena occurring at the location of the measuring instruments use various methods for monitoring precipitation phenomena.

Thus a number of devices for measuring the precipitation rate as well as the strength or intensity of precipitation are known, with which precipitation is collected to be able to make statements about the amount as well as the intensity of previous precipitation. One particular embodiment of this type of measuring devices comprises two oscillating collection vessels or "tilting buckets", with which the precipitation in liquid state is collected. Additionally, a heating apparatus is provided, with which frozen precipitation is melted to water to determine the amount of precipitation.

The measuring method described above, however, does not provide measuring results with high accuracy. On the one hand, there often is a long signaling interval for light precipitation, and on the other hand, a too low precipitation value is displayed on occurrence of "blowing" precipitation.

Therefore, for more precise measurements, devices are known using optical or electrical measuring methods, with which generally the amount of precipitation as well as the rate of fall and the size of the precipitation particles is measured. One measuring principle, for example, is based on the effect, that particles falling through an electrical field change their capacity, while other measuring methods detect the reflection of light rays at precipitation particles.

In DE 35 90 723 C2, an automated system for identifying the type of precipitation, and for determining precipitation strength or visibility, respectively, is described. The represented system substantially comprises a beam source for generating a beam bundle, as well as a detector for detecting the radiation scattered or reflected, respectively, by airborne or precipitation particles within a test volume. The beam source emits radiation with a wavelength from the visible and near-visible spectral ranges; for example, a diode emitting visible light or infrared radiation is used for that. The detector includes a sensor with a photoelectric element. Furthermore, a lens or a screen, respectively, is provided, which is arranged such that the detector can only detect a discrete range of the beam, in particular the radiation scattered forwards at a medium angle or central scattering angle of 30° to 35° compared to the axis of the beam bundle. Due to this measuring arrangement, the size of the test volume is limited to 200-1000 ml. Thus this device is a measuring instrument with which precipitation types are exclusively detectable in a very small sector of the atmosphere only. Detection of precipitation types at different altitudes of the atmosphere, however, is not possible with this device. Furthermore, it is, for example, also not possible to determine the altitude at which the state of aggregation of a precipitation, e.g. from snow to rain, changes.

Furthermore, from "F. Prodi et. al.: "Time Variability in Rainfall Events Observed by Pludix; $2^{nd}$ European Conference on Radar Meteorology; Delft, NL; 18-22 Nov. 2002", a device is known using electromagnetic radiation for determination of precipitation types. Two radar transmitters transmit beam bundles such that a test volume is formed having a diameter of approx. one meter, and reaching up to a height of 3 m above the measuring device. Via detectors, the frequency of radiation scattered at precipitation particles in the test volume is determined, and subsequently the rate of fall of the precipitation particles is determined considering the frequency shift compared to the transmitting frequency. The measurement interval, via which the recorded measured values are integrated, is 60 s. With the measuring device described in this publication, however, it is also not possible to detect precipitation phenomena occurring in the atmosphere altitude-resolved, and thus to state the precipitation types occurring at different altitude levels. Furthermore, for systems with crossed beams in the short range, the scattering angle changes when precipitation particles fall through the scattering volume. A rate of fall thus includes an entire range of Doppler shifts, the width of which depends on the scattering geometry. Since here no unequivocal relation between Doppler shift and rate of fall exists, the Doppler spectrum is not unequivocal, but can only be interpreted with restricting assumptions via drop size distribution.

Beside the measuring devices stated above, polarimetric Doppler weather radars are further known, with which a classification of precipitation types is possible, wherein precipitation particles can be detected within a radius of up to 300 km. One example of such a device is the polarimetric Doppler radar operated by DLR (German Aerospace Center) in Oberpfaffenhofen since 1986. The disadvantage of the weather radars stated above is that due to the curvature of the earth the altitude, at which the lowest detectable measuring volume is located, increases quadratically with increasing distance from the radar, making characterization of the precipitation striking the ground unreliable.

SUMMARY OF THE INVENTION

Based on the known state of the art, the object underlying the invention is to state a method with which, using low plant-engineering effort, determination of the precipitation types occurring at various altitude levels as well as the precipitation intensity is possible. In particular, respective measurements are to be executable with reliable results up to an altitude of about 2000 m.

A method according to the invention, is characterized in that on analyzing characteristics of the reflection signals a course of a difference frequency spectrum formed by transmitting frequency spectrum and reflection frequency spectrum is analyzed resolved by altitude levels.

With the above method it is thus possible to obtain information about the precipitation phenomena occurring at the respective altitude levels separated by altitude levels in a simple manner. Since the method according to the invention can be realized with a multitude of known measuring devices being able to emit electromagnetic radiation to the atmosphere, and to receive reflection signals, investigations of the atmosphere can be executed from nearly any measuring location without requiring substantial effort for installation and adjustment of the measuring equipment.

If the output signals are reflected or scattered, respectively, at a higher altitude, the strength of the reflection signal as well as the overall travel time resulting from the travel time of the output and the reflection signal are changed. Determination of the type of precipitation, however, takes place as described in more detail in the following by analyzing the course of the difference frequency spectrum, also called Doppler shift. If the characteristic courses of the function curves of precipitation types existing at different altitude levels are to be compared with one another, these preferentially have to be normalized to a uniform value of receive power.

The altitude at which the transmitted or output signal, respectively, is scattered is determined from the time shift between the transmitted and the received signal. Particularly suitable for that is the so-called Doppler FM CW method (FM-CW=Frequency Modulated Continuous Wave). Important in this method is that transmission takes place with a constant transmitting power. Since with this the available transmitter power is used to the maximum, a power of the transmitter of only a few milliwatts is required. The frequency of the signal is modulated saw-tooth shaped so that a reflection signal caused by scattering in the atmosphere is modulated saw-tooth shaped as well. The frequency of the reflection signal detected with a transmitting unit, however, is compared to that of the transmitted signal shifted proportionally to the height of the measuring volume due to the travel time shift. From this difference frequency between output and reflection signal, the measuring altitude is derived.

Beside the frequency shift between output and reflection signal due to the change in travel time of the signal, further effects can occur in the atmosphere, causing an additional frequency shift. Thus as soon as precipitation phenomena occur in the atmosphere, the signal is not only scattered at one altitude, but according to the vertical precipitation distribution scattered more or less uniformly from a larger altitude range.

In the end, from a reflection signal made up of a multitude of measuring signals scattered at various altitude levels, information about the respective altitude level, from which a measuring signal originates, as well as about the rate of fall of the precipitation particles moving at the respective altitude level, must be determined.

The simultaneous determination of the receive powers from several altitude levels representing the different measuring altitudes takes place by a Fourier analysis (FA1) of the difference frequency spectrum within a saw-tooth period. In this manner, a multitude of spectral lines is determined respectively representing different receive powers of the output signal scattered at different altitude levels. The receive power finally is a measure of the scattering power at the altitude level corresponding to the respective spectral line.

As mentioned above, each altitude level-specific spectral line contains additional information about the rate of fall of the precipitation particles. By means of a second Fourier analysis (FA2), the altitude level-specific spectral lines are divided into preferably 64 different rate of fall-specific spectral lines. Each of these spectral lines represents a rate of fall. The rate of fall-specific spectral lines 1 to 64 correspond to rates of fall of the precipitation particles from 0.19 to about 12 m/s, which allows conclusions to be made regarding the drop size at the respective altitude level. In a particular embodiment of the method according to the invention, 58 spectral values at the frequency interval 3 to 61 are used. In this case, the smallest resolvable rate of fall of a precipitation particle is 0.57 m/s, which corresponds to a drop size of 0.21 mm.

The exact rate of fall of the precipitation particles at an altitude level is determined from the phase shift of the spectral lines corresponding to this measuring altitude in successive saw-tooth periods of the reflection signal. Here again it has to be considered, that not all precipitation particles occurring at one altitude level move with the same rate of fall, but that according to the size distribution of the precipitation particles a rate of fall distribution is to be observed. This distribution and the spectral signal power associated with each rate at one altitude level is determined by the fact that for a larger number of successive saw-tooth periods the sequence of the spectral lines corresponding to this altitude level is submitted to a second spectral analysis (FA2). The result of FA2 represents the Doppler spectrum of the signal received from the respective measuring altitude.

The fall movement of the precipitation particles described above results in a further frequency shift due to the Doppler effect. In this connection it is important to distinguish the frequency shift caused by the change in travel time of the output signal compared to the reflection signal from the frequency shift caused by the fall movement of the precipitation particles at the different altitude levels. If there is no exact identification of the frequency shift caused by the two different effects, there can be ambiguities in the altitude resolution. Therefore, FA1 is preferably dimensioned such that the respective Doppler shift resulting due to the maximum rate of fall to be expected is small compared to the line distance of FA1.

In a particular embodiment of the method according to the invention, the output as well as the reflection signals are transmitted or received, respectively, by a combined transmitting and receiving unit. The transmitted as well as the reflected beam bundle thus cover exactly the same distance, however, in the opposite direction. Thus there is no crossing of various beam bundles; therefore the measuring range is not limited to a certain test volume.

The scattering angle in the entire scattering volume is uniformly 180°, and the beam width is preferably set to a value of 1°. In this manner, an unequivocal relation between the Doppler shift and the rate of fall of the precipitation particles is guaranteed.

To obtain explicit results for the precipitation phenomena, the area above the measuring device is preferably divided into 30 altitude levels, of which the topmost 28 altitude levels are used for analysis of the reflection signals. The determination of the dimension of the individual altitude levels is variably selected depending on the respective atmosphere range to be analyzed. In a particular embodiment of the method according to the invention, the individual altitude levels have a vertical dimension of 35 m. In this manner, distinction of precipitation types in a range from 70-1050 m above the measuring device is possible. Analysis of the reflection signal preferably takes place at an interval of 10 s.

A further particular embodiment of the method according to the invention provides the combination of the above features, such that in this case a rain radar, in particular a 24 GHz FM-CW radar, provides power spectrums for 30 measuring altitudes with an average time of 10 seconds. The altitude resolution is 35 m, wherein the first analyzable altitude interval is centered at 70 m. In this case the 10-second intervals include 6 measurements each, which, however, are not completely recorded and analyzed, since time is also required for transmission of the data.

Tests have furthermore shown that for a reliable distinction of the various precipitation types occurring in the near-ground level atmosphere, a limitation to the analysis of the reflection signals received from four different altitude levels is sufficient. For that, preferably the altitude levels 70-105 m, 105-140 m, 210-245 m as well as 420-455 m are used for classification of the precipitation types. Of the four selected altitude levels, the two lower altitude levels, i.e. 70-105 m as well as 105-140 m, are selected to receive a higher weight of the spectrums' information about the precipitation near ground level, while the upper two altitude levels are mainly analyzed to receive information about possible sleet phenomena.

Detection and subsequent determination of liquid precipitation particles at the two selected lower altitude levels as well as of frozen precipitation particles at the two upper selected altitude levels are based on the same measuring principle. The frequency shift compared to the transmitting frequency, the so-called Doppler shift, is determined, which states the rate of fall of the detected precipitation objects in the scattering volume. For raindrops, the rate of fall, provided that the vertical movement of the air is neglected, depends on the drop size. From the received power per frequency interval, preferably the drop concentration is derived, since the backscattering cross-section as a function of the drop size according to the Mie theory (for example: Born, Wolf; Winkelverteilung der senkrechten und parallelen Komponente der Intensität von an Kugeln gestreutem Licht; 1973) is known, and the scattering powers of the individual drops add up. In this manner, for liquid precipitation the rain rate can be determined. Thus from the Doppler spectrums for liquid precipitation at all altitude levels respectively used for measurement, drop sizes, number of particles, rain rate and liquid water content can be determined.

For distinction of the various precipitation types in the atmosphere, the course of the respective difference frequency spectrums, i.e. of the frequency shifts between transmitting frequency and receiving frequency spectrums, is analyzed. This analysis method results in correct results, since the difference frequency spectrums show characteristic shapes for the various precipitation types, which are independent from the travel time of the electromagnetic signals in the atmosphere.

The course of the difference frequency spectrum is preferably analyzed considering at least one parameter. With the determination of
- a maximum value of the receive power,
- a value for the difference frequency (=frequency shift between output and reflection signal) at maximum intensity of the difference frequency spectrum,
- a width of the difference or differential frequency spectrum,
- a quotient formed from the maximum value and the width of the difference frequency spectrum, and/or
- a difference frequency between a maximum value and a value from the center of the difference spectrum, one or several parameters are calculated, with which the course of the difference frequency spectrum is analyzed.

In a further particular embodiment of the method according to the invention, the parameter is classified to value the significance of the individual parameters in determination of the precipitation type. With the classification it is considered whether due to a parameter used for the analysis a certain precipitation type can clearly be concluded, or whether there is, or how high, respectively, the uncertainty about the presence of a certain precipitation type at an altitude level is.

Preferably, for one parameter, depending on reaching a certain threshold value representing a certain precipitation type, up to 10 points are allocated. If the parameter lies between two threshold values, different precipitation types have to be expected at the respective altitude level. Depending on the number n of the precipitation types to be expected between two threshold values, 10 divided by n points are allocated to the respective precipitation type. Therefore, if many different precipitation types fall under the respective category, the probability that only one precipitation type exists is low, and only few points are allocated. If the parameter, however, reaches a threshold value which clearly suggests the presence of only one precipitation type, many points are allocated. In this manner the precipitation type prevailing at the respective altitude level is determined including probability considerations. Preferably, the at least one parameter is determined separately for the four specifically selected altitude levels, and that precipitation type is stated as prevailing for which, according to the method described above, the most points were determined.

Besides determination of the precipitation type at a certain altitude level, the detection whether a precipitation event takes place at all is of special significance. Preferably, the decision, whether precipitation falls or not, is made by detection of a signal in the difference frequency spectrum. On analyzing characteristics of the reflection signals a precipitation event is in particular assumed, as soon as at least four values of the difference frequency spectrum of an altitude level lie above an altitude level-specific threshold value. Preferably, the altitude level-specific threshold value is determined according to the specification:

"Average values of the noise background of the difference frequency spectrum added to the 1.5-fold value of the standard deviation".

The noise background is estimated according to the following specification:
1. Determination of the average value $m_{i\ (zero\ point)}$ of the spectral power
2. Removal of the line with maximum power
3. Determination of the average value $m_{i+1}$ (still remaining remainder is used for power determination) of the spectral power,
4. If $m_{i+1} < m_i$, return to 2. Otherwise $m_{i+1}$ is the noise background.

The above method is preferredly applied to the four specifically selected altitude levels. If no precipitation is detected for the two lower altitude levels, no precipitation event is assumed for the entire analysis.

If a precipitation phenomenon is detected, it is furthermore important to separate the actual signal from the noise. For that, the noise background estimated according to the above specification is subtracted from the signal. The frequency spectrum determined in this manner subsequently serves the determination of precipitation intensity and type.

In a further particular embodiment of the method according to the invention, the drop spectrums derived with the rain radar are used for determination of the current Z/R relation required for quantitative precipitation measurements with weather radars. The melting zone is detected according to the distinct rate of fall gradient.

In this connection, value Z represents the only parameter to be determined with conventional weather radars, and is designated as the so-called radar reflectivity factor. This radar reflection factor is calculated as follows:

$$Z = \Sigma(\text{individual drop diameters})^6$$

Furthermore, R represents the so-called rain rate, generally in [mm/h]. If a drop size distribution would be clearly allocated to each rain rate, then Z and R would be fixedly interlinked. In reality, however, there are different drop size distributions for the same rain rate. If by means of the method according to the invention the current drop size distribution in a scattering volume is determined, then in a preferred manner, the link between Z and R can also be determined for this volume and this time.

Using the method according to the invention, extensive measurements, for which a multitude of measuring locations is selected, can also be realized with relatively low effort. In particular at traffic junctions, information about precipitation intensity and type, as well as respective visibility distance information, can be gained early by providing respective measuring systems.

According to the invention an apparatus for determination of precipitation types in the atmosphere is furthermore provided, comprising at least one transmitting unit for transmitting output signals, at least one receiving unit for receiving reflection signals formed by scattering of the output signals at precipitation particles in the atmosphere and having a reflection frequency spectrum, as well as an analyzing unit for analyzing characteristics of the reflection signals, characterized in that the transmitting and the receiving unit are combined in a combination transmitting-receiving element such that a beam path covered by the output and the input signal is nearly identical, and that with the analyzing unit characteristics of the reflection signals can be analyzed on the basis of a course of a difference frequency spectrum formed by transmitting frequency and reflection frequency spectrum resolved by altitude levels.

Due to the special structure of the apparatus according to the invention it is guaranteed that the scattering angle in the entire scattering volume is uniformly 180°. The beam width is limited to a value of about 1°. Thus using the above measuring apparatus, an unequivocal relation between Doppler shift and rate of fall of the precipitation particles can be established. It is in particular excluded, that the scattering angle changes when the precipitation particles fall through the scattering volume, as for example the case with systems with crossed beams in the short range of the measuring device. Since rather an unequivocal relation between the Doppler shift and the rate of fall of the precipitation particles exists, the Doppler spectrum can be clearly interpreted via the drop size distribution.

In a particular embodiment of the apparatus according to the invention, the combined transmitting-receiving element comprises a feedhorn as well as at least one parabolic mirror. The feedhorn generates electromagnetic radiation directed to the parabolic mirror, which from there is transmitted into the atmosphere as a beam bundle.

Furthermore, a modulation generator is preferably provided, which is synchronized with an analog-digital converter, with which a transmitting frequency of the output signal can be modulated. The modulation generator generates a saw-tooth shaped voltage.

SPECIFIC DESCRIPTION OF THE INVENTION

In the following, the invention will be described without limitation of the general idea of the invention by way of example on the basis of embodiments referring to the drawings. The figures show.

WAYS OF CARRYING OUT THE INVENTION

Industrial Usability

Figure 1:
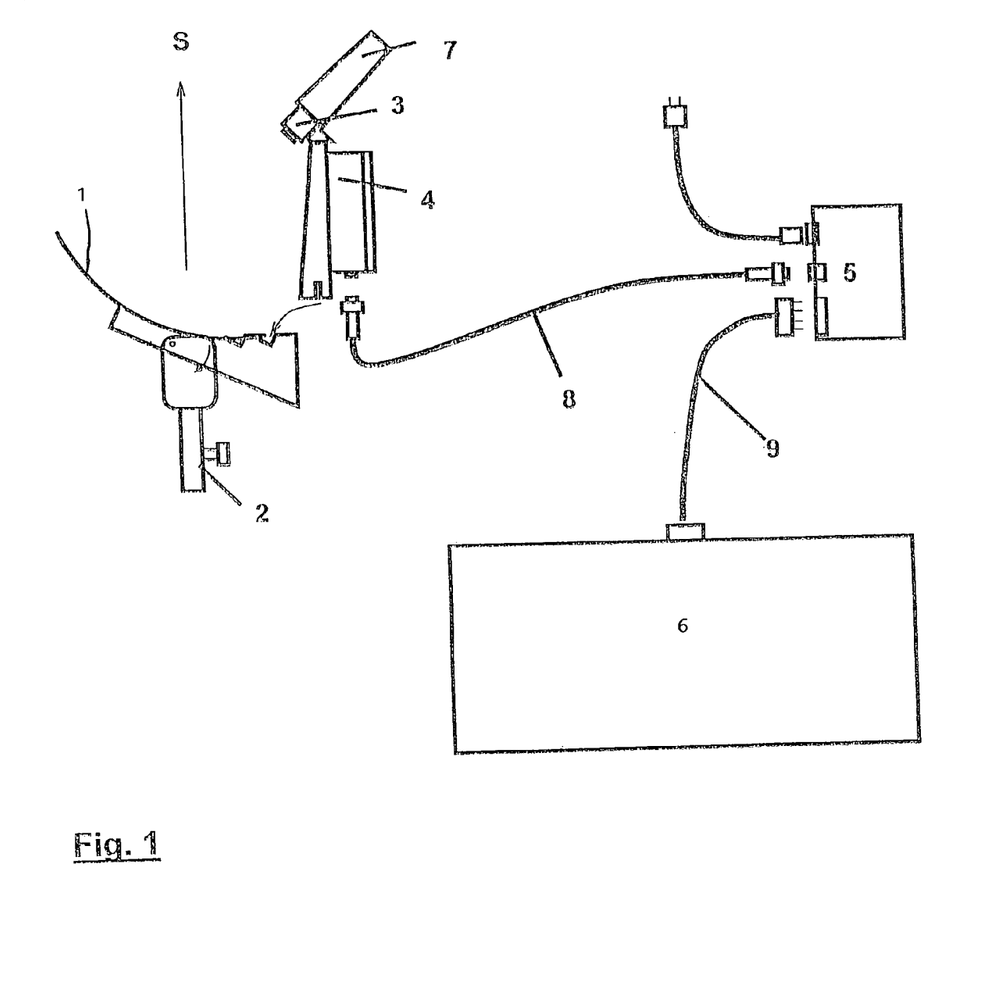
FIG. 1 Schematic overview over the main components of an apparatus for determination of precipitation types in the atmosphere FIG. 2 Detailed schematic view of a transmitting and receiving unit FIG. 3 Doppler Spectrums

FIG. 1 shows the schematic structure of an apparatus for determination of precipitation types in the atmosphere with its main components. The main components include a parabolic mirror 1 mounted at a fixture 2, a beam generating element 7, a signal transmitting and receiving element 4, a voltage supply 5, as well as an analyzing unit 6.

Within the beam-generating element 7, which transmits electromagnetic radiation with a frequency of 24 GHz, as well as receives the radiation scattered in the atmosphere, a feedhorn 3 is provided. This feedhorn or horn aerial 3 is a parabolic aerial or antenna disposing via a hollow horn-shaped waveguide. The beam axis of the feedhorn 3 is directed at the focal point of the parabolic mirror 1. From there, the beam bundle is transmitted into the atmosphere in the direction of beam axis "S". The beam width of the beam bundle is set to 1°. Furthermore, the scattering angle in the entire monitored volume is 180°, so that the transmitted as well as the reflected beam bundle cover exactly the same beam path, however, in the opposite direction.

Figure 2:
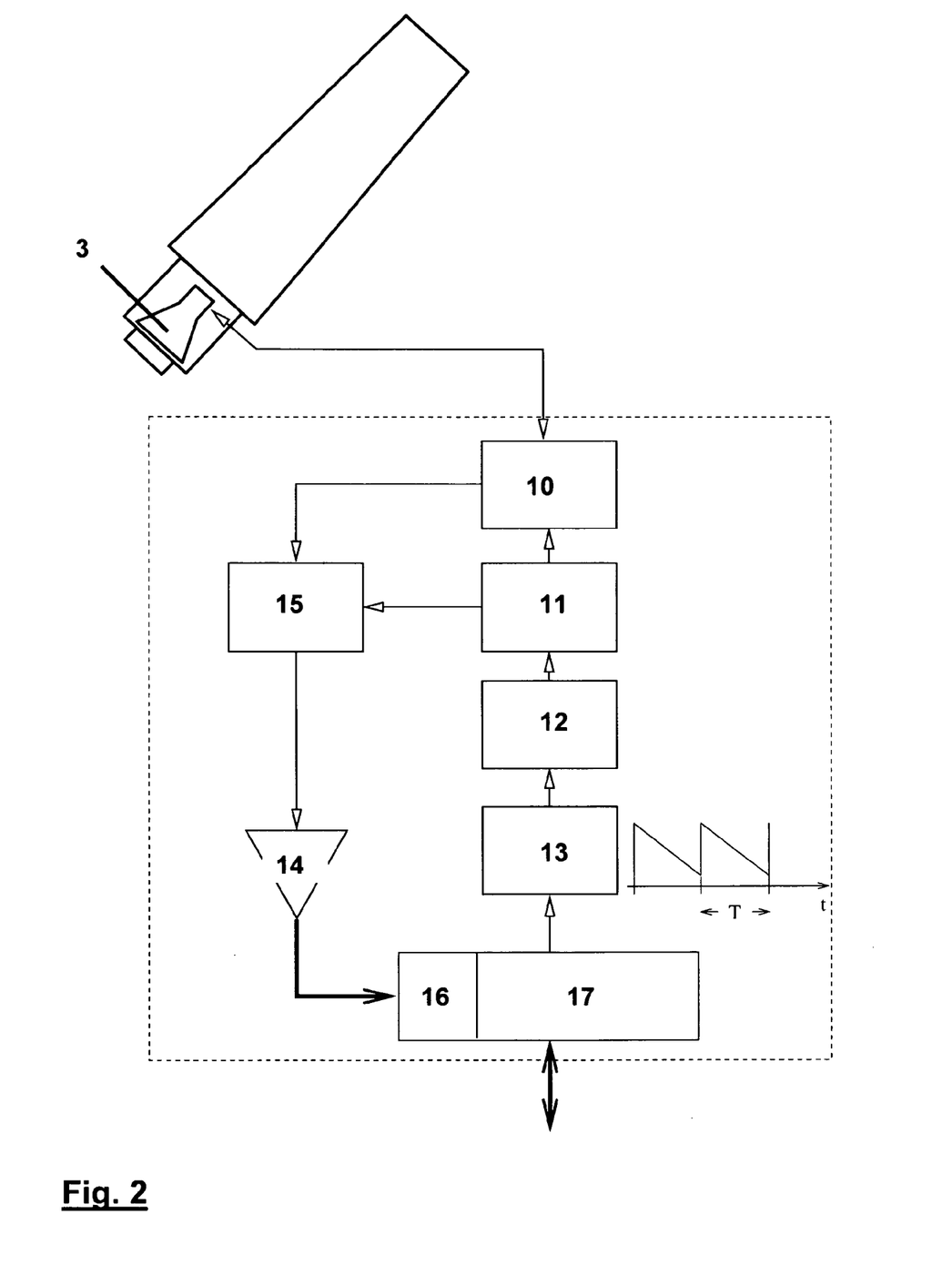

The beam-generating element 7 receives the control signal required for generation of the radiation from the signal transmitting and receiving unit 4, the structure of which is further explained in more detail in the description of FIG. 2. Via a combined control data and energy supply cable 8, the signal transmitting and receiving unit 4 is connected to the voltage supply 5. The voltage supply 5 is in turn connected to the analyzing unit 6 via a data cable 9. The analyzing unit 6 is a microprocessor-controlled computer analyzing the detected and processed signals from the atmosphere, and thus executes a precipitation classification on the basis of altitude level-specific Doppler spectrums. The frequency of the output signals is modulated saw-tooth shaped, so that a reflection signal caused by scattering in the atmosphere is also modulated saw-tooth shaped. The frequency of the reflection signal detected with a transmitting unit, however, is compared to the transmitted signal shifted proportional to the height of the measuring volume due to the travel time shift. From this difference frequency between output and reflection signal, the measurement altitude is derived.

In the analyzing unit 6, the shapes of the Doppler spectrums formed by processing a received signal in the signal transmitting and receiving unit 4 are finally analyzed. On account of this shape analysis of the spectrums and their characteristic altitude dependence, the precipitation types occurring at the different altitude levels are determined. The method for analyzing the spectrums will be explained in detail in the following.

FIG. 2 shows the individual components of the signal transmitting and receiving unit 4. The signal transmitting and receiving unit 4 comprises a circulator 10, a signal coupler 11, a voltage-controlled oscillator 12, a modulation generator 13, a receive mixer 14, an amplifier 15, an analog-digital converter 16, as well as a digital signal processor 17.

The modulation generator 13 generates a saw-tooth shaped modulated voltage, the modulation lift of which is set by the digital signal processor 17. For that, the modulation lift is selected depending on the desired altitude resolution of the measurement data. The voltage-controlled oscillator 12, which generates the actually transmitted signal with a frequency of 24.1±0.01 GHz, is frequency-modulated with the periodic, saw-tooth shaped modulated voltage. Synchronization of the transmitted signal generated in this manner takes place by means of the analog-digital converter 16. Subsequently, the main part of the transmitted signal is directed to the feedhorn 3 via the circulator 10, which serves as transmitting-receiving switch. A small part of the transmitted signal is coupled out via the signal coupler 11, and directed to the receive mixer 14.

In the transmit and receive mixer 14, the product of the received reflection signal coming from the circulator 10, and the transmitted signal coupled out in the signal coupler 11, is formed. The signal share resulting from multiplication of the two signals, with the difference frequency between the transmitted and the received signal, is directed to the amplifier 15. The amplifier 15 is a low-noise pre-amplifier, which amplifies the difference frequencies between the transmitted and received signal, whereby the frequency band comprises 0-65 kHz. Via the analog-digital converter 16, the amplified signal is finally directed to the digital signal processor 17. Here the digitalized signal is analyzed using a two-dimensional Fourier analysis, and thus altitude-resolved Doppler spectrums are determined.

These altitude-resolved spectrums are transmitted to the analyzing unit 6, which by means of a second Fourier analysis (FA2) divides the altitude level-specific spectral lines into 64 different, rate of fall-specific spectral lines. Each of these spectral lines represents one rate of fall. The rate of fall-specific spectral lines 1 to 64 correspond to rates of fall of the precipitation particles from 0.19 to about 12 m/s. The rate of fall finally explains which precipitation particles occur at a certain altitude level.

For determination of the precipitation type prevailing at an altitude level, a shape analysis of the spectral lines as determined above is carried out. For this shape analysis carried out in the analyzing unit 6, 58 spectral lines are used.

Figure 3:
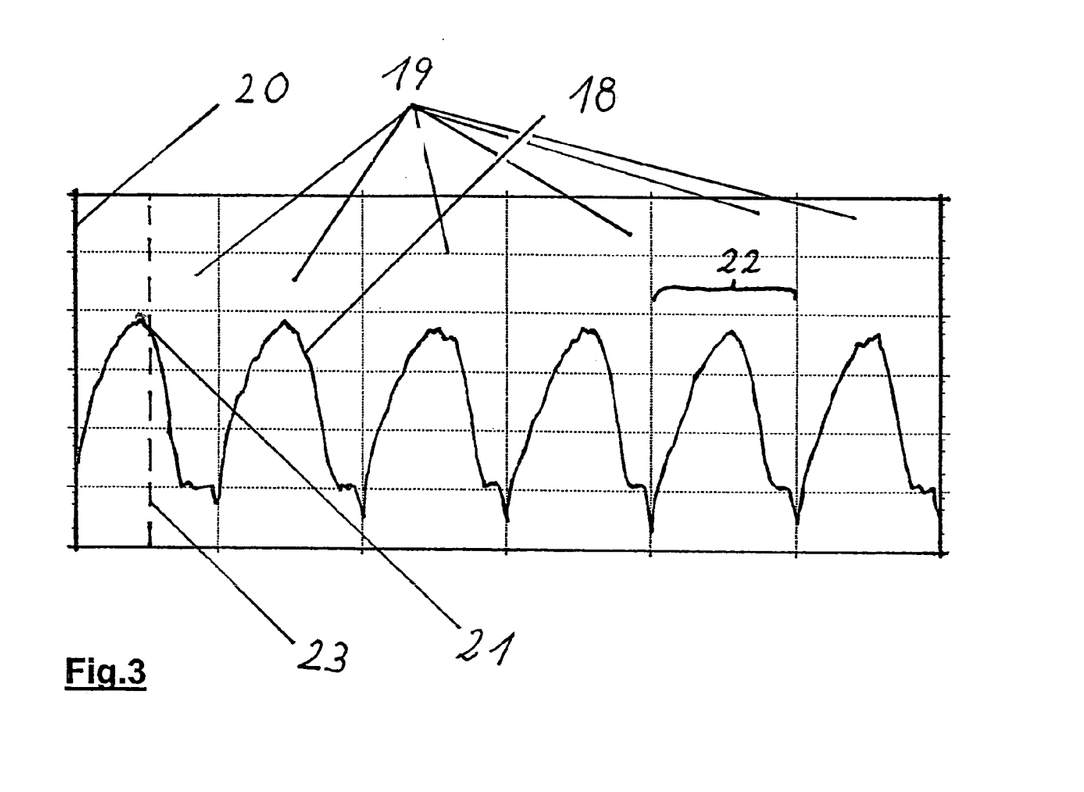

By means of FIG. 3, the shape analysis of the recorded difference frequency spectrums is to be explained in more detail by way of example. FIG. 3 shows difference frequency spectrums or Doppler spectrums, respectively, for rain, which were recorded with the method according to the invention. In the diagrams, six Doppler spectrums 18 for six altitude levels 19 having a vertical dimension of 35 m, and lying in an altitude range of 70 to 245 m, are represented side by side. The altitude level-specific Doppler spectrums 18 are again respectively divided into 64 different frequencies, wherein each frequency is allocated a rate of fall of the precipitation particles of 0 to 12 m/s. Due to the rate of fall finally the drop size at the respective altitude level 19 can be concluded. Additionally, the shape of the altitude level-specific Doppler spectrums 18 is examined. From the characteristic shape of the Doppler spectrums 18, the precipitation type respectively occurring at an altitude level 19 is concluded. Thus from the respective frequency shift, the rate of fall of the precipitation particles and from the shape of the Doppler spectrum, the precipitation type at a certain altitude level, can be determined.

To be able to reliably distinguish the various precipitation types, a total of five parameters for classification is used for the shape analysis of the spectral lines. Thus the strength 20 of the signal, the determined rate of fall at maximum intensity of the signal, the width 22 of the spectrum, the difference between the center 23 of the spectrum and the maximum 21 of the spectrum, as well as the quotient from the maximum 21 of the spectrum and the width 22 of the spectrum are examined for each spectral line 18. For each of these parameters, different threshold values are determined representing a certain precipitation type or precipitation composition, respectively. The distance of a parameter value from a threshold value indicates how high the probability is that a certain precipitation type or precipitation composition respectively is to be expected at an altitude level. If due to the parameter value reached for example only one precipitation type is to be expected, then this precipitation type is allocated 10 points. If, however, n different precipitation types could occur, then each of these precipitation types is only allocated 10/n points.

Finally it is inquired for all five parameters, which precipitation type has respectively been allocated the most points, and thus the precipitation type occurring at the individual altitude levels is determined.

The specification incorporates by reference the disclosure of German priority document 103 05 139 filed Feb. 7, 2003 and PCT/EP02/12229 filed Nov. 2, 2002.

The present invention is, of course, in no way restricted to the specific disclosure of the specification and drawings, but also encompasses any modifications within the scope of the appended claims.

LIST OF REFERENCE NUMBERS

1 Parabolic mirror
2 Fixture
3 Feedhorn
4 Signal transmitting and receiving unit
5 Voltage supply
6 Analyzing unit
7 Radiation generating element
8 Combined power supply and control data cable
9 Data cable
10 Circulator
11 Signal coupler
12 Voltage-controlled oscillator
13 Modulation generator
14 Receive mixer
15 Amplifier
16 Analog-digital converter
17 Digital signal processor
18 Altitude level-specific Doppler spectrum
19 Altitude level
20 Strength of the signal
21 Maximum of the spectrum
22 Width of the spectrum
23 Center of the spectrum

The invention claimed is:

1. A method for determining types of precipitation in the atmosphere, including the steps of:
transmitting output signals, wherein said output signals have a transmitting frequency spectrum;

detecting reflection signals formed by scattering of said output signals at precipitation particles at least two altitude levels, wherein said reflection signals have a reflection frequency spectrum;

analyzing characteristics of said reflection signals, wherein during such analyzing step, a characteristic shape or course of a function curve of a difference frequency spectrum formed from said transmitting frequency spectrum and said reflection frequency spectrum is analyzed, resolved by altitude levels, taking into consideration at least one parameter that is determined based on a maximum value of a receive power and on a value for a difference frequency at maximum intensity of said difference frequency spectrum, a width of said difference frequency spectrum, a quotient formed from a maximum value and a width of the difference frequency spectrum, and a difference frequency between a maximum value and a value in the center of said difference frequency spectrum; and executing a precipitation classification of precipitation present in the atmosphere based on said characteristic shape or course of the function curve of the difference frequency spectrum formed from said transmitting frequency spectrum and said reflection frequency spectrum, resolved by altitude levels.

2. A method according to claim 1, wherein said output signals and said reflection signals are transmitted or received, respectively, by a combined transmitting and receiving unit.

3. A method according to claim 1, wherein a vertical dimension of 35 m is selected for said altitude levels.

4. A method according to claim 1, wherein said output signals and said reflection signals are transmitted or received, respectively, to or from, respectively, twenty-eight altitude levels.

5. A method according to claim 1, wherein a time span of 10 s is selected as a measurement time interval for said step of analyzing characteristics of said reflection signals.

6. A method according to claim 1, wherein four altitude levels are used for analyzing said reflection signals.

7. A method according to claim 6, wherein the altitude levels 70 to 105 m, 105 to 140 m, 210 to 245 m, and 420 to 455 m are used for analyzing said reflection signals.

8. A method according to claim 1, wherein during said step of analyzing characteristics of said reflection signals, a precipitation event is assumed as soon as at least four values of said difference frequency spectrum of one altitude level are above an altitude level-specific threshold value.

9. A method according to claim 8, wherein said altitude level-specific threshold value is determined by calculating an average value of the noise background of the difference frequency spectrum added to a 1.5 fold value of a standard deviation of the difference frequency spectrum.

10. A method according to claim 1, wherein for determining a noise level, a maximum value of said difference frequency spectrum is determined, eliminated, and subsequently an average value of said difference frequency spectrum decreased by the eliminated maximum value is determined.

11. A method according to claim 1, wherein determined drop spectrums are used for determining a current Z/R relation.

12. A method according to claim 1, wherein 70 m is selected as a lowest measuring altitude.

13. A method according to claim 1, wherein a transmitting frequency of said output signal is modulated in a saw-tooth shaped manner.

14. A method according to claim 1, wherein said output signal is transmitted at a constant transmitting power.

15. An apparatus for determining types of precipitation in the atmosphere, comprising:

at least one transmitting unit for transmitting output signals having a transmitting frequency spectrum;

at least one receiving unit for receiving reflection signals formed by scattering of said output signals at precipitation particles in the atmosphere and having a reflection frequency spectrum, wherein said transmitting unit and said receiving unit are combined into a combination transmitting-receiving element such that a beam path covered by said output signal and said input signal is nearly identical; and an analyzing unit for analyzing characteristics of said reflection signals taking into consideration a characteristic shape of a function curve of a difference frequency spectrum formed from said transmitting frequency spectrum and said reflection frequency spectrum, resolved by altitude levels, taking into consideration at least one parameter that is determined based on a maximum value of a receive power and on a value for a difference frequency at maximum intensity of said difference frequency spectrum, a width of said difference frequency spectrum, a quotient formed from a maximum value and a width of the difference frequency spectrum, and a difference frequency between a maximum value and a value in the center of said difference frequency spectrum, wherein said analyzing unit is further configured to execute a precipitation classification based on said characteristic shape of the function curve of the difference frequency spectrum formed from said transmitting frequency spectrum and said reflection frequency spectrum, resolved by altitude levels.

16. An apparatus according to claim 15, wherein said combination transmitting-receiving element comprises a feedhorn as well as at least one parabolic mirror.

17. An apparatus according to claim 15, wherein a modulation generator is provided for modulating a transmission frequency of said output signal.

* * * * *